(12) United States Patent
Bomfim et al.

(10) Patent No.: US 10,745,546 B2
(45) Date of Patent: Aug. 18, 2020

(54) MAGNETIC COMPOSITION, COVERING COMPRISING IT AND ASSOCIATED METHODS

(71) Applicant: MONDO S.p.A., Alba Frazione Gallo (CN) (IT)

(72) Inventors: Joao Antonio Sarno Bomfim, Alba Frazione Gallo (IT); Maurizio Stroppiana, Alba Frazione Gallo (IT)

(73) Assignee: MONDO S.p.A., Alba Frazione Gallo (CN) (IT)

( * ) Notice: Subject to any disclaimer, the term of this patent is extended or adjusted under 35 U.S.C. 154(b) by 300 days.

(21) Appl. No.: 15/621,274

(22) Filed: Jun. 13, 2017

(65) Prior Publication Data

US 2017/0355837 A1 Dec. 14, 2017

(30) Foreign Application Priority Data

Jun. 13, 2016 (IT) .................. 102016000060276

(51) Int. Cl.
  *C08L 9/06* (2006.01)
  *E04F 15/02* (2006.01)
  (Continued)

(52) U.S. Cl.
  CPC .................. *C08L 9/06* (2013.01); *C08K 3/22* (2013.01); *E04F 13/0883* (2013.01); *E04F 15/02144* (2013.01); *H01F 1/0027* (2013.01); *H01F 41/16* (2013.01); *A47G 27/04* (2013.01); *C08K 2003/085* (2013.01); *C08K 2003/2272* (2013.01); *C08K 2003/2275* (2013.01); *C08K 2201/001* (2013.01); *C08L 2205/08* (2013.01); *C08L 2312/00* (2013.01)

(58) Field of Classification Search
  CPC ........ H01F 1/28; H01F 1/117; E04F 13/0883; E04F 15/02144
  See application file for complete search history.

(56) References Cited

U.S. PATENT DOCUMENTS 5,429,899 A * 7/1995 Chiba .................. G03G 9/0839
                                              428/403
5,524,317 A * 6/1996 Nagahama ............ A47L 23/266
                                              15/217

(Continued)

FOREIGN PATENT DOCUMENTS

JP        2-11386       1/1990
JP        7-29151       1/1995
(Continued)

OTHER PUBLICATIONS

Search Report issued in EP Appln. No. 17 175 579.6 dated Oct. 18, 2017.

(Continued)

*Primary Examiner* — C Melissa Koslow
(74) *Attorney, Agent, or Firm* — Nixon & Vanderhye P.C.

(57) ABSTRACT

Composition for making magnetic coverings comprising at least one elastomer, at least one magnetic filler, at least one compatibilizer, wherein the at least one magnetic filler is present in the composition in an amount comprised between 90% and 300% by weight, preferably between 100% and 250% by weight based on the weight of the least one elastomer.

18 Claims, 1 Drawing Sheet

(51) Int. Cl.
*E04F 13/08* (2006.01)
*H01F 1/00* (2006.01)
*C08K 3/22* (2006.01)
*H01F 41/16* (2006.01)
*A47G 27/04* (2006.01)
*C08K 3/08* (2006.01)

(56) References Cited

U.S. PATENT DOCUMENTS

| | | | |
|---|---|---|---|
| 6,312,795 | B1 | 11/2001 | Yamamoto |
| 2001/0021729 | A1 | 9/2001 | Papp et al. |
| 2002/0183427 | A1* | 12/2002 | Yamaguchi ............. C08K 3/22 |
| | | | 524/261 |
| 2008/0152902 | A1 | 6/2008 | Adler |
| 2009/0114440 | A1* | 5/2009 | Yamamoto ............... H01F 1/26 |
| | | | 174/391 |

FOREIGN PATENT DOCUMENTS

| | | | |
|---|---|---|---|
| JP | 2001-115044 | * | 4/2001 |
| WO | WO 2017/151429 | * | 9/2017 |

OTHER PUBLICATIONS

Office Action issued in EP Appln. No. 17 175 579.6 dated Apr. 16, 2019.

* cited by examiner

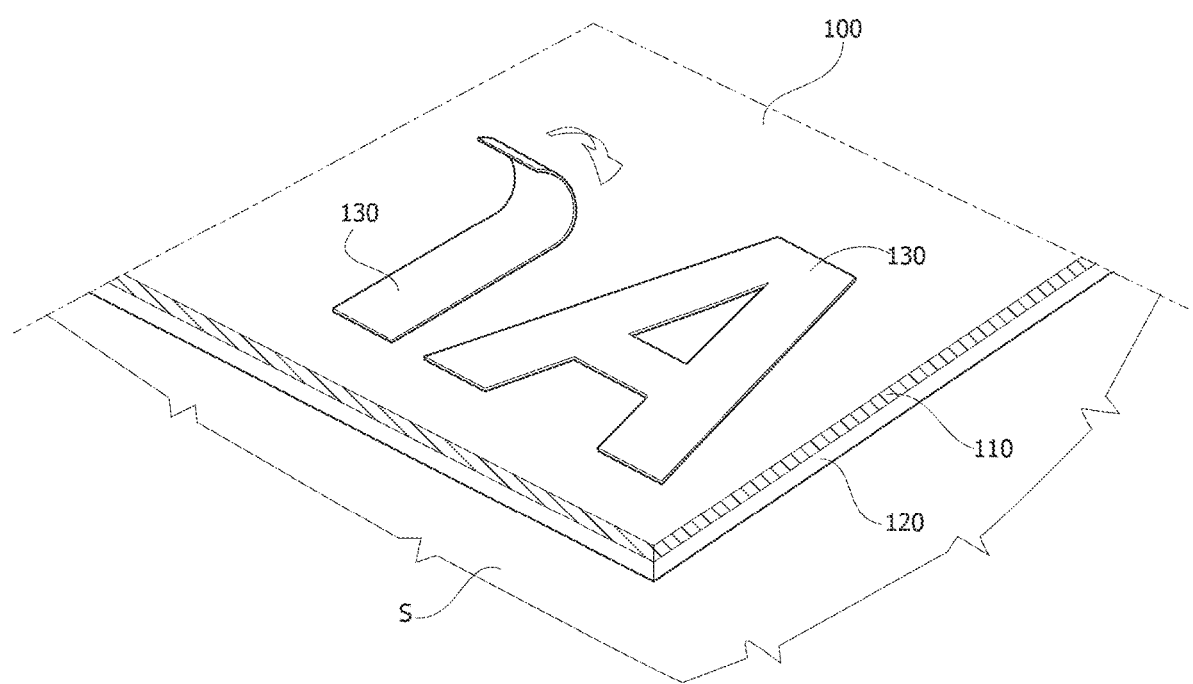

MAGNETIC COMPOSITION, COVERING COMPRISING IT AND ASSOCIATED METHODS

This application claims priority to IT Patent Application No. 102016000060276 filed Jun. 13, 2016, the entire content of which is hereby incorporated by reference.

TECHNICAL FIELD

The present description refers to compositions with magnetic properties ("magnetic compositions").

One or more embodiments may regard, for example, magnetic compositions for coverings of surfaces, such as floorings or wall coverings.

TECHNOLOGICAL BACKGROUND

Materials endowed with magnetic properties (e.g. ferromagnetic, ferrimagnetic or paramagnetic materials, shortly "magnetic materials") can be used—as filling agents or fillers—in elastomer based compositions such as rubber based compositions to produce magnetic or magnetizable products, i.e. products having a permanent magnetic field or which are able to show magnetic characteristics in response to the application of an external magnetic field. Elastomer compositions including fillers (i.e. "magnetic fillers") with magnetic properties are disclosed, for example, in EP-B-1 789 487.

Magnetic materials can be used for coverings to be applied to surfaces, for example to floors (or walls). On such coverings can then be applied, for example, magnetic carpets.

In order to achieve good magnetic properties, said elastomer compositions may require a high concentration of magnetic materials used as filling agents or fillers. Magnetic materials, however, are non-reinforcing materials, i.e. materials that do not have a reinforcement function. Thus, the compositions containing them may have the disadvantage of not having the appropriate mechanical properties for the desired application.

Moreover, the size of magnetic filler particles can also affect the mechanical properties of the resulting compositions.

Specifically, particles having a diameter size between and 200 nm (also known as nanoparticles or submicron particles) can be dispersed homogeneously in the composition without affecting the aesthetic appearance of the final product, for example following the crosslinking process. However, the incorporation of high amounts of such particles can cause an increase in the viscosity of the resulting composition and thus making difficult its processing phase.

On the contrary, the use of larger particles (for example with a diameter size comprised between 1 and 200 µm) can cause compatibilization problems between the magnetic filler and the elastomer, resulting in alteration of the physical-mechanical properties of the final product.

Magnetic elastomer compositions can therefore be difficult to employ, for example, for making coverings of surfaces, such as floorings or wall coverings. With respect to floorings, for example, in order to be suitable for such specific use, they must comply with specific technical standards that may regulate, for example, abrasion resistance (measured, for example, according to ISO 4649 method), indentation resistance (measured, for example, according to EN ISO 24343 method), tear resistance (measured, for example, according to the ISO 34-1 method) or corrosion resistance by chemicals (measured, for example, according to EN ISO 26987 method).

OBJECT AND SUMMARY

One or more embodiments are intended to overcome the drawbacks outlined above.

According to one or more embodiments, such an object can be achieved by a magnetic composition having the features recited in the following claims.

One or more embodiments may relate to a corresponding covering as well as a method for coating a surface with such covering and a method for using such a covering.

The claims form an integral part of the technical teaching here given in relation to the embodiments.

According to one or more embodiments, a magnetic composition for making layers of magnetic coverings may include:
- at least one elastomer,
- at least one magnetic filler,
- at least one compatibilizer, wherein the at least one magnetic filler is present in the composition in an amount comprised between 90 and 300% by weight, preferably between 100% and 250% by weight, based on the weight of the at least one elastomer.

In one or more embodiments, the at least one magnetic filler may be present in the form of particles having an average diameter comprised between 1 and 200 µm, preferably between 6 and 80 µm.

In one or more embodiments, such a composition allows to produce layers of covering materials with magnetic properties and at the same time with a high mechanical, abrasion and tear resistance and an excellent flexibility (this property can be measured, for example, by applying the EN ISO 24344 standard, with spindle diameter=20 mm).

One or more embodiments allow obtaining a laminar covering comprising at least one layer containing the disclosed composition.

In one or more embodiments, the composition contained in at least one layer of a laminar covering can be crosslinked or subjected to a crosslinking process.

In one or more embodiments, the laminar covering may be a surface covering, preferably a flooring and/or a wall covering.

As already mentioned above, the phrase "composition with magnetic properties" refers to a composition, which, optionally following a transformation process into an article such as a covering layer, may respond to an external magnetic field with an attraction force.

In one or more embodiments, the phrase "composition with magnetic properties" refers to a composition, which may exhibit, in a non-exclusive way, ferromagnetic, ferrimagnetic, anti-ferrimagnetic or paramagnetic properties.

BRIEF DESCRIPTION OF THE FIGURE

One or more embodiments will be described, purely by way of non-limiting example, with reference to the accompanying FIGURE (FIG. 1), which represents a perspective view of a covering, which can be achieved according to the embodiments.

DETAILED DESCRIPTION

The following description illustrates various specific details aimed to a depth understanding of examples of one or more embodiments according to the description. The embodiments can be realized without one or more of the specific details, or with other methods, components, materials, and so on. In other cases, known structures, materials, or operations are not shown or described in detail to avoid obscuring various aspects of the embodiments. The reference to "an embodiment" within this description is to indicate that a particular configuration, structure or feature described in relation to the embodiment is contained in at least one embodiment. Thus, phrases as "in an embodiment", possibly present in different places in this description, do not necessarily refer to the same embodiment. In addition, particular configurations, structures or characteristics may be combined in an appropriate way in one or more embodiments.

The references used here are for convenience only and do not therefore define the protection scope or the embodiment scope.

In FIG. 1, reference number 100 generally indicates a laminar covering (e.g., a flooring) comprising a layer 110 susceptible to containing the magnetic composition exemplified below.

In one or more embodiments, the covering layer 110 may be applied directly to a surface S to be covered.

In one or more embodiments, the layer 110 may form a covering top layer applied to a substrate 120 (of a known type), which is directly applied, in turn, on a surface S to be covered.

In one or more embodiments, the surface S to be covered can be, for example, a wall or floor surface.

The laminar covering 100 comprising at least one layer containing the disclosed composition can be applied to the surface S to be covered or to a substrate 120 by means of techniques such as, for example, bonding or mechanical fixing. These application techniques are known per se and not to require a detailed description herein.

The covering 100 may also comprise a modular structure consisting of several elements. This modular structure can be equipped with a self-laying system. For example, the various elements may be provided with a mutual interlocking portion (also called "interlock" or defined as "puzzle"-shaped) for the installation of the structure itself. Such installation mode does not require the use of adhesives or plasters.

FIG. 1 also shows laminar magnetic elements 130 (for example, in the form of numbers, letters, symbols, various geometric shapes, etc. . . . ) that can be applied on the covering 100.

Such laminar elements can be magnetically retained on the covering 100, e.g. in a detachable manner.

In one or more embodiments, a composition for making layers of magnetic coverings comprises at least one elastomer, at least one magnetic filler, at least one compatibilizer; the at least one magnetic filler is present in the composition in an amount comprised between 90% and 300% by weight (% w/w), preferably between 100% and 250% by weight (% w/w) based on the weight of the at least one elastomer.

In other words, the weight ratio between the at least one magnetic filler and the at least one elastomer is comprised, in the composition, between (90:100) and (300:100), preferably between (100:100) and (250:100).

Such a composition, comprising the specific weight ratio between magnetic filler and elastomer, provides layers of covering materials with magnetic properties and at the same time with a high mechanical, abrasion, tear resistance, and an excellent flexibility, as specified below.

In one or more embodiments, the at least one elastomer can be selected from the group consisting of synthetic rubbers such as butadiene-styrene rubber (SBR), ethylene-propylene-diene rubber (EPDM), nitrile rubber (NBR), natural rubber (NR), and mixtures thereof.

In one or more embodiments, the at least one elastomer may consist of a mixture of butadiene-styrene rubber (SBR) and ethylene-propylene-diene rubber (EPDM).

In one or more embodiments, SBR and EPDM mixtures may be preferred in order to achieve compositions having a good resistance to aging and corrosion by atmospheric agents, a pleasant aesthetic appearance and a good impact resistance to falling weights.

In one or more embodiments, the at least one elastomer may exhibit a diene content comprised between 4 and 40%, preferably between 6 and 30%, and a Mooney Viscosity (ML 1+4 at 100° C.) comprised between 40 and 65 MU.

In one or more embodiments, the at least one elastomer may be present in the composition in an amount comprised between 10% and 40% by weight (% w/w), preferably between 20% and 30% by weight (% w/w) of the composition.

In one or more embodiments, the at least one elastomer may include butadiene-styrene rubber (SBR) in an amount comprised between 10% and 30% by weight (% w/w) of the composition and EPDM rubber and/or natural rubber (NR) in an amount of 5% or more, preferably comprised between 6% and 15% by weight (% w/w) of the composition.

In one or more embodiments, the at least one magnetic filler contained in the composition can be selected from the group consisting of magnetite, iron powder, ferrite.

As already indicated, the term "magnetic filler" means a material capable of generating a magnetic field or responding to an external magnetic field with an attraction force. Magnetic materials may exhibit, for example, ferrimagnetic, ferromagnetic or paramagnetic properties.

An example of magnetic material is magnetite, both synthetic and naturally occurring; magnetite has the advantage to be corrosion resistant and not incurring in oxidation phenomena resulting in degradation of the resulting composition.

An additional advantage in using magnetite is that such material causes no undesirable side reactions with elastomer curing process during the composition preparation process, especially during the mixing phase but also during the phase of crosslinking, obtained by both vulcanization with a sulfur process and accelerators, conducted by both sulfur donors and peroxide crosslinkers (such as dicumylperoxide or t-butylperoxide) or with a combination of these three processes above mentioned.

In one or more embodiments, magnetic filler may be present in the composition in an amount comprised between 25% and 60% by weight (% w/w), preferably between 30% and 50% by weight (% w/w) of the composition.

In one or more embodiments, the at least one magnetic filler may be present in the form of particles having an average diameter size comprised between 1 and 200 μm, preferably between 6 and 80 μm.

The average diameter is expressed as d50 (median distribution of particle diameters).

In one or more embodiments, the magnetic filler may be coated on the surface with compounds such as, but not limited to, silanes, waxes, fatty acids and esters or salts thereof in order to increase the capacity of the magnetic filler thus treated to adhere to elastomer and/or to disperse in the composition before the crosslinking phase.

In one or more embodiments, magnetic filler may be uncoated on the surface.

In one or more embodiments, for example when the magnetic filler is uncoated, the composition comprises at least one compatibilizer, namely at least one compound that can aid the adhesion between at least one uncoated magnetic filler and the at least one elastomer present in the composition.

In one or more embodiments, the at least one compatibilizer may be selected from the group consisting of silanes, preferably mercaptosilanes and/or vinyl silanes, resins and/or waxes derived from hydrocarbons (such as benzofuran resins, coumarone resins, aliphatic hydrocarbon resins (commonly known as "C5 resins", "C9 resins" or "C5/C9 resins"), coumarone, long-chain fatty acids, preferably stearic acid and/or oleic acid, and mixtures thereof.

In one or more embodiments, the at least one compatibilizer may be a mixture of mercaptosilane, stearic acid and coumarone.

Such a mixture has the double advantage of facilitating the incorporation of the fillers and reducing the viscosity of the composition by facilitating the method for processing the composition, for example by calendering.

In one or more embodiments, silanes can be employed in liquid form. Mercaptosilans can be preferably employed when the method for producing the composition involves a sulfur crosslinking phase, while vinyl silanes may preferably be employed when the crosslinking phase is carried out with peroxide.

In one or more embodiments, the composition comprises mercaptosilane and/or vinyl silane in an amount comprised between 0.5% and 2% by weight (% w/w), preferably between 0.6% and 1% by weight (% w/w) of the composition.

In one or more embodiments, the composition comprises coumarone in an amount comprised between 1% and 3% by weight (% w/w), preferably between 1.5% and 2.5% by weight (% w/w) of the composition.

In one or more embodiments, the composition may include long-chain fatty acids, preferably stearic acid, in an amount comprised between 0.3% and 2% by weight (% w/w), preferably between 0.5% and 1% by weight (% w/w) of the composition.

In one or more embodiments, the composition may comprise at least one reinforcing filler compatible with both synthetic rubbers and natural rubbers.

The at least one inorganic reinforcing filler (or filler that by nature is not known as reinforcing but becomes reinforcing due to surface treatment) can be selected from the group consisting of precipitated silica, kaolin (including natural and synthetic caolinites), carbon black and their mixtures.

In one or more embodiments, the at least one compatibilizer in combination with the at least one reinforcing filler may provide a composition capable of giving the surface upon which it is applied further improved properties in terms of impact, abrasion, tear resistance.

In one or more embodiments, the at least one reinforcing filler may consist of a mixture of silica, surface-treated kaolin and carbon black.

The kaolin can be treated on the surface by compatibilizing agents such as fatty acids, e.g. stearic acid, or silanes.

In one or more embodiments, the composition comprises precipitated silica in an amount comprised between 5% and 25% by weight (% w/w), preferably between 10% and 20% (w/w) by weight of the composition.

In one or more embodiments, the composition may include kaolin treated on the surface by silanes in an amount comprised between 5% and 20% by weight (% w/w), preferably between 6% and 15% (% w/w) of the composition.

In one or more embodiments, the composition may comprise carbon black (gas black) in an amount comprised between 1% and 15% by weight (% w/w), preferably between 1.2% and 4% by weight (% w/w) of the composition.

In one or more embodiments, the composition herein disclosed may contain chemical additives also known as process adjuvants to control the viscosity and workability of the composition in industrial plants.

In one or more embodiments, process adjuvants may be, for example, plasticizers (softening compounds), which allow to regulate the viscosity of the composition and to vary the glass transition temperature of the elastomer following the crosslinking process of the composition. Plasticizers can be selected from the group consisting of phthalic acid esters, phosphoric acid esters, adipates, sebacates, aliphatic and aromatic oils, antiozonant and dispersing waxes, polyethylene glycol (PEG), fatty acid esters, metallic soaps (e.g. calcium and zinc stearates), zinc oxide and stearin, reinforcing resins, adhesion promoters or inhibitors.

In one or more embodiments, the composition may also include crosslinking accelerators. Crosslinking accelerators can be selected, for example, from the group consisting of CBS (cyclohexyl benzothiazolesulfenamide, CAS number 95-33-0), TMTD (tetramethylthiuram disulfide CAS number 137-26-8) or Mercaptobenzothiazole (MTB, CAS number 149-30-4), zinc dibutyldithiocarbamate (ZDBC, CAS number 136-23-2) or other accelerators of the same families (sulphenamides, thiourams, thiazoles, carbamates).

The composition of the present description can be produced by the use of mixers in which the at least one elastomer, at least one compatibilizer, at least one magnetic filler are first incorporated in one or more consecutive steps, optionally with the addition of at least one reinforcing filler, chemical additives, crosslinking additives.

In one or more embodiments, the resulting composition can be processed and transformed, for example, into layers for floor coverings by, for example, molding, extrusion or calendering processes.

In one or more embodiments, the composition thus processed can be crosslinked by thermal processes such as hot calendering or hot moulding, or by irradiation procedures using microwave sources, infrared rays or electronic beams.

In one or more embodiments, the disclosed composition may be contained in at least one layer of a laminar covering.

The disclosed composition allows obtaining layers of laminar covering materials having magnetic properties, with a high mechanical, abrasion, tear resistance and a high flexibility.

The composition, for example contained in at least one laminar covering layer, for example of a flooring, may have a hardness (Shore A Hardness; ASTM D2240) of 65-95 units (preferably 70-85 units), an abrasion value (ASTM D3389) of less than 600 mg (preferably less than 500 mg), an abrasion resistance (ISO 4649 method A) of less than 300 mm3 (preferably less than 250 mm3), an indentation resistance (according to EN ISO 24343 method) of less than 0.25 mm (preferably less than 0.1 mm), a tensile strength (ASTM D412) with a breaking load of more than 5 MPa (preferably more than 6 MPa) and a breaking elongation of more than 100% (preferably more than 150%), a specific gravity between 1.5 and 1.85 g/cm3 (preferably between 1.6 and 1.75 g/cm3) and a dimensional stability (ISO 23999) of less than 0.40%.

Examples

Two examples of a method for preparing the disclosed composition are given below.

TABLE 1

Two-step preparation, Banbury mixer

First cycle

| | | |
|---|---|---|
| 1 | Pre-mastication of the at least one elastomer | 0-2 min |
| 2 | Incorporation of the magnetic and inorganic reinforcing fillers, in the presence of compatibilizers | 2-4 min |
| 3 | Incorporation of chemical additives and process adjuvants | 4-5 min |
| 4 | Discharge of the mixture obtained at a maximum temperature of 160° C., cooling | at least 4 h, room temperature |

Second cycle

| | | |
|---|---|---|
| 5 | Processing of the mixture in the mixer, mastication | 0-3 min |

TABLE 1-continued

Two-step preparation, Banbury mixer

| | | |
|---|---|---|
| 6 | Incorporation of vulcanization or crosslinking additives | 3-5 min |
| 7 | Final discharge of the mixture, maximum temperature 120° C. | |

TABLE 2

One-step preparation, Banbury mixer

Single cycle

| | | |
|---|---|---|
| 1 | Pre-mastication of the at least one elastomer | 0-3 min |
| 2 | Incorporation of the magnetic and inorganic reinforcing fillers, in the presence of compatibilizers | 3-5 min |
| 3 | Incorporation of chemical additives and process adjuvants | 5-6 min |
| 4 | Incorporation of vulcanization or crosslinking additives | 6-8 min |
| 5 | Discharge of the mixture, maximum temperature 125° C. | |

In one or more embodiments, the composition obtained by the described methods may be processed and transformed, for example, into layers for floor coverings by, for example, hot calendering processes.

In one or more embodiments, the composition thus processed is subjected to a crosslinking process.

In one or more embodiments, the disclosed composition may be comprised in at least one layer of a laminar covering.

Table 3 below illustrates non-limiting examples of compositions (A, B, C, D) according to the instant description.

TABLE 3

| Substance type | Chemical substance | Comp. A Amount (g) | Comp. B Amount (g) | Comp. C Amount (g) | Comp. D Amount (g) |
|---|---|---|---|---|---|
| Elastomer | SBR | 18.6 | 17.9 | 19.0 | 18.0 |
| Elastomer | EPDM | 10.0 | 6.0 | 8.9 | 6.7 |
| Inorganic reinforcing filler | Treated kaolin | 9.5 | 7.9 | 10.7 | 10.0 |
| Inorganic reinforcing filler | Silica | 15.2 | 14.3 | 12.5 | 13.1 |
| Chemical additive | Zinc oxide | 1.5 | 1.0 | 1.4 | 1.3 |
| Compatibilizer | Stearic acid | 0.7 | 0.8 | 0.7 | 0.8 |
| Compatibilizer | Cumarone | 1.6 | 1.8 | 1.6 | 1.6 |
| Compatibilizer | Mercaptosilane | 0.8 | 0.6 | 0.5 | 0.5 |
| Chemical additive and process adjuvant | Softening oil | 4.3 | 2.1 | 2.9 | 3.2 |
| Uncoated magnetic filler | Magnetite | 34.4 | 45.3 | 35.7 | 42.1 |
| Reinforcing filler | Carbon black | 2.0 | 1.2 | 1.0 | 1.8 |
| Vulcanization additive | Sulphur | 0.7 | 0.5 | 0.7 | 0.5 |
| Vulcanization accelerants | CBS | 0.7 | 0.6 | 0.6 | 0.7 |

Of course, without prejudice to the underlying principle, the embodiments and the realization details may vary, even significantly, from what is here illustrated merely as a non-limiting example without departing from the protection scope.

This protection scope is determined by the attached claims.

The invention claimed is:

1. Composition for the manufacture of magnetic coverings comprising:
    at least one elastomer,
    at least one magnetic filler,
    at least one compatibilizer,
    wherein the at least one magnetic filler is present in the composition in an amount between 90% and 300% by weight based on the weight of the at least one elastomer,
    wherein the magnetic filler is magnetite,
    wherein the composition further comprises at least one inorganic reinforcing filler.

2. The composition as claimed in claim 1, wherein the at least one elastomer is selected from the group consisting of styrene-butadiene rubber (SBR), ethylene-propylene-diene rubber (EPDM), nitrile rubber (NBR), natural rubber (NR), and mixtures thereof.

3. The composition as claimed in claim 2, wherein the at least one elastomer is contained in the composition in an amount between 10% and 40% by weight of the composition.

4. The composition as claimed in claim 2, wherein the at least one elastomer is contained in the composition in an amount between 20% and 30% by weight of the composition.

5. The composition as claimed in claim 1, wherein the at least one magnetic filler is present in the form of particles having an average diameter between 1 and 200 µm.

6. The composition as claimed in claim 1, wherein the at least one magnetic filler is present in the form of particles having an average diameter between 6 and 80 µm.

7. The composition as claimed in claim 1, wherein the at least one compatibilizer is a mixture of mercaptosilane, stearic acid and coumarone.

8. Composition for the manufacture of magnetic coverings comprising:
    at least one elastomer,
    at least one magnetic filler,
    at least one compatibilizer,
    wherein the at least one magnetic filler is present in the composition in an amount between 90% and 300% by weight based on the weight of the at least one elastomer,
    wherein the magnetic filler is magnetite,
    wherein the at least one compatibilizer is a mixture of mercaptosilane, stearic acid and coumarone.

9. The composition as claimed in claim 8, wherein the at least one elastomer is selected from the group consisting of styrene-butadiene rubber (SBR), ethylene-propylene-diene rubber (EPDM), nitrile rubber (NBR), natural rubber (NR), and mixtures thereof.

10. The composition as claimed in claim 8, wherein the at least one elastomer is contained in the composition in an amount between 10% and 40% by weight of the composition.

11. The composition as claimed in claim 8, wherein the at least one elastomer is contained in the composition in an amount between 20% and 30% by weight of the composition.

12. The composition as claimed in claim 8, wherein the at least one magnetic filler is present in the form of particles having an average diameter between 1 and 200 µm.

13. The composition as claimed in claim 8, wherein the at least one magnetic filler is present in the form of particles having an average diameter between 6 µm and 80 µm.

14. Composition for the manufacture of magnetic coverings comprising:
    at least one elastomer,
    at least one magnetic filler,
    at least one compatibilizer,
    wherein the at least one magnetic filler is present in the composition in an amount between 90% and 300% by weight based on the weight of the at least one elastomer,
    wherein the magnetic filler is magnetite,
    wherein the at least one compatibilizer is selected from the group consisting of silanes, resins and/or waxes derived from hydrocarbons, cumarone resins, aliphatic hydrocarbon resins, coumarone, long-chain fatty acids, and mixtures thereof,
    wherein the composition further comprises at least one inorganic reinforcing filler.

15. The composition as claimed in claim 14, wherein the silanes are mercaptosilanes and/or vinyl silanes, the resins derived from hydrocarbons are benzofuran resins, the long-chain fatty acids are stearic acid and/or oleic acid.

16. The composition as claimed in claim 14, wherein the at least one elastomer is selected from the group consisting of styrene-butadiene rubber (SBR), ethylene-propylene-diene rubber (EPDM), nitrile rubber (NBR), natural rubber (NR), and mixtures thereof.

17. The composition as claimed in claim 14, wherein the at least one elastomer is contained in the composition in an amount comprised between 10% and 40% by weight of the composition.

18. The composition as claimed in claim 14, wherein the at least one magnetic filler is present in the form of particles having an average diameter comprised between 1 and 200 µm.

* * * * *